US012602158B2

(12) United States Patent
Dubey

(10) Patent No.: US 12,602,158 B2
(45) Date of Patent: Apr. 14, 2026

(54) MANAGING NAMESPACE MAPPING IN A MEMORY SUB-SYSTEM

(71) Applicant: MICRON TECHNOLOGY, INC., Boise, ID (US)

(72) Inventor: Rishabh Dubey, Agrate Brianza (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/940,127

(22) Filed: Nov. 7, 2024

(65) Prior Publication Data

US 2025/0173060 A1     May 29, 2025

Related U.S. Application Data

(60) Provisional application No. 63/603,238, filed on Nov. 28, 2023.

(51) Int. Cl.
*G06F 3/06* (2006.01)
*G06F 12/02* (2006.01)

(52) U.S. Cl.
CPC .......... *G06F 3/0607* (2013.01); *G06F 3/0644* (2013.01); *G06F 3/0679* (2013.01); *G06F 12/0246* (2013.01); *G06F 2212/7201* (2013.01); *G06F 2212/7202* (2013.01)

(58) Field of Classification Search
CPC .... G06F 3/0607; G06F 3/0644; G06F 3/0679; G06F 12/0246; G06F 2212/7201; G06F 2212/7202
See application file for complete search history.

(56) References Cited

U.S. PATENT DOCUMENTS

| | | | |
|---|---|---|---|
| 2021/0157720 A1* | 5/2021 | Bert | G06F 3/0608 |
| 2021/0191850 A1* | 6/2021 | Subbarao | G06F 3/064 |
| 2023/0058424 A1* | 2/2023 | Frolikov | G06F 3/0659 |

(Continued)

*Primary Examiner* — Kevin Verbrugge
(74) *Attorney, Agent, or Firm* — Lowenstein Sandler LLP

(57) ABSTRACT

A system includes a first memory device; a second memory device; and a processing device, operatively coupled with the first memory device and the second memory device, to perform operations including: determining a size of the first memory device designated for storing a plurality of address mapping data structures, wherein each address mapping data structure of the plurality of address mapping data structures is associated with a corresponding namespace of a plurality of namespaces, wherein each namespace of the plurality of namespaces is associated with a corresponding region of a second memory device; associating a first address mapping granularity level with the first memory device for storing a first address mapping data structure of the plurality of address mapping data structures; determining a remaining available space of the first memory device by excluding a first size of the first address mapping data structure from the size of the first memory device, wherein the first size is calculated based on the first address mapping granularity level; and associating, in view of the remaining available space of the first memory device and a remaining available space of the second memory device, a second address mapping granularity level with the first memory device for storing a second address mapping data structure of the plurality of address mapping data structures.

20 Claims, 6 Drawing Sheets

200

(56)     References Cited

U.S. PATENT DOCUMENTS

| | | | |
|---|---|---|---|
| 2024/0069775 A1* | 2/2024 | Muthya Narahari | ........................ G06F 3/0679 |
| 2024/0070086 A1* | 2/2024 | Muthya Narahari | ... G06F 12/10 |
| 2024/0152455 A1* | 5/2024 | Xu | ...................... G06F 12/0804 |
| 2024/0403217 A1* | 12/2024 | Shetty | ................. G06F 12/0871 |
| 2025/0061061 A1* | 2/2025 | Helmick | ............. G06F 12/0246 |

* cited by examiner

300A

| NSID | LBA Range | Namespace Capacity | L2P Table Granularity | L2P Table Size |
|------|-----------|--------------------|-----------------------|----------------|
| 1 | LBA xxx-xxx' | 512GB | 4KB | 512MB |
| 2 | LBA yyy-yyy' | 512GB | 8KB | 256MB |
| 3 | LBA zzz-zzz' | 512GB | 16KB | 128MB |
| 4 | LBA aaa-aaa' | 512GB | 16KB | 128MB |

300B

- GET_L2P_TOTAL_SIZE_B
- SET_L2P_PAGE_GRANULARITY <NSID>
- GET_L2P_AVAILABLE_SIZE_B
- RESIZE_L2P_PAGE_GRANULARITY <NSID>

300C

| Logical Block Address | Physical Block Address |
|---|---|
| LBA xxx1 | PBA mmm1 |
| LBA xxx2 | PBA mmm2 |
| ... | ... |
| LBA xxxn | PBA mmmn |

310C

400

Obtain a size of a first memory device designated for
storing a plurality of L2P tables of a plurality of
namespaces, where each of the plurality of namespaces
corresponds to a region of a second memory device
410

Set a first granularity in the first memory device for
storing a first L2P table of the plurality of L2P tables
&
Set a first capacity of the second memory device used as
a first namespace of the plurality of namespaces, the first
L2P table corresponding to the first namespace
420

Calculate a remaining size of the first memory device by
excluding a first size of the first L2P table from the total
size of the first memory device
&
Calculate a remaining capacity of the second memory
device by excluding the first capacity of the second
memory device from a total capacity of the second
memory device
430

In view of the remaining size of the first memory device
and the remaining capacity of the second memory device,
set a second granularity in the first memory device for
storing a second L2P table of the plurality of L2P tables
&
set a second capacity of a second memory device used as
a second namespace of the plurality of namespaces, the
second L2P table corresponding to the second namespace
440

FIG. 4

MANAGING NAMESPACE MAPPING IN A MEMORY SUB-SYSTEM

RELATED APPLICATIONS

This application claims the benefit of U.S. Provisional Patent Application No. 63/603,238, filed Nov. 28, 2023, the entire contents of which are incorporated by reference herein.

TECHNICAL FIELD

Embodiments of the disclosure relate generally to memory sub-systems, and more specifically, relate to managing namespace mapping in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 4 is a flow diagram illustrating an example method to implement managing namespace mapping in a memory sub-system, in accordance with some embodiments of the present disclosure.

DETAILED DESCRIPTION

Figure 1:
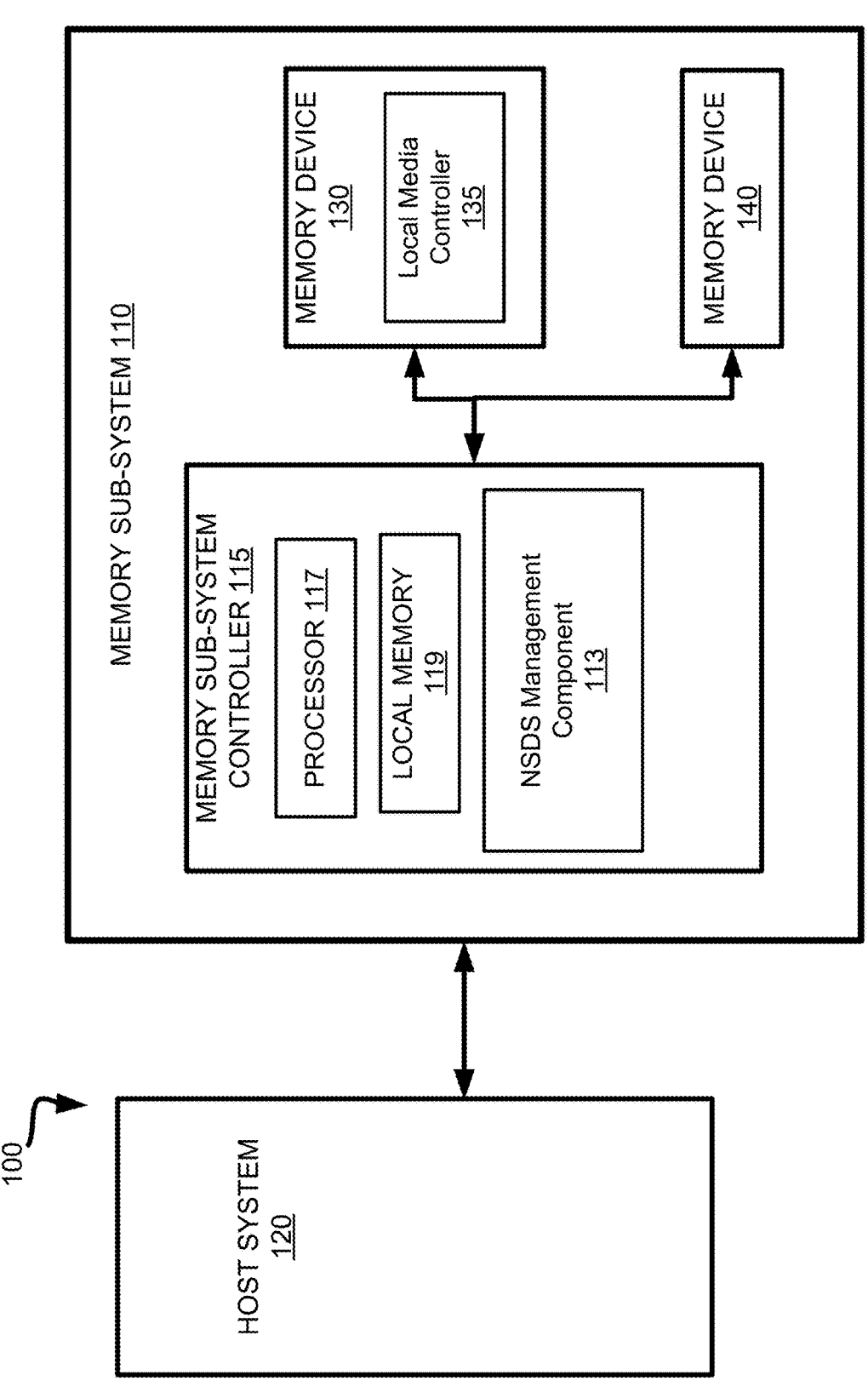
FIG. 1 illustrates an example computing system that includes a memory sub-system, in accordance with some embodiments of the present disclosure.

Aspects of the present disclosure are directed to managing namespace mapping in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a NAND memory device. Other examples of non-volatile memory devices are described below in conjunction with FIG. 1. A non-volatile memory device is a package of one or more dies. Each die includes one or more planes. For some types of non-volatile memory devices (e.g., NAND devices), each plane includes a set of physical blocks. Each block consists of a set of pages. Each page includes a set of memory cells. A memory cell is an electronic circuit that stores information. Depending on the memory cell type, a memory cell can store one or more bits of binary information, and has various logic states that correlate to the number of bits being stored. The logic states can be represented by binary values, such as "0" and "1", or combinations of such values.

Memory access operations can be performed by the memory sub-system. The memory access operations can be host-initiated operations. For example, the host system can initiate a memory access operation (e.g., write, read, erase, etc.) on a memory sub-system. The host system can send memory access commands (e.g., write command, read command) to the memory sub-system, such as to store data in the memory device at the memory sub-system and to read data from the memory device of the memory sub-system. The data to be read or written, as specified by a host request, is hereinafter referred to as "host data." A host request can include logical address information (e.g., logical block address (LBA) and an identifier of a namespace) for the host data, and the logical address information identifies\the location where the host data is to be stored at or read from. The logical address information can be part of metadata for the host data. The metadata and host data, together, are hereinafter referred to as "payload." Metadata can also include error handling data (e.g., ECC codeword, parity code), data version (e.g., used to distinguish age of data written), LBA validity bitmap (which LBAs or logical transfer units contain valid data), and the like.

The host system can use a logical address space to access the memory device. When the host system requests to access data (e.g., read data, write data), the host system can send a memory access command to the memory device, where the memory access command specifies a logical address from the logical address space. The logical address can identify a logical unit, such as a logical block. For some types of memory devices, a logical block is the smallest write/read unit. For example, the size of data in a logical block can be 512 bytes, 4096 bytes (4 KB), etc., depending on the specification of the memory device. In certain memory devices, a logical block can be a group of logical pages. A logical page is an abstraction of physical pages. A memory sub-system can define a logical page to be equal to a particular unit of physical storage (e.g., a physical page, a physical block, etc.). A logical block address (LBA) is an identifier of a logical block. In an addressing scheme for logical blocks, logical blocks can be identified by their respective integer indices, with the first block being LBA 0, the second being LBA 1, and so on.

In certain memory devices, the logical address space of the memory device is divided into namespaces that allow for more efficient management of data. A namespace is a portion of the logical address space, and each namespace can be mapped, through an address mapping data structure, to multiple logical blocks. For example, one or more LBAs can be mapped to a particular namespace. Each namespace can be referenced using a corresponding namespace identifier (NSID). For each namespace, the memory sub-system controller can store namespace metadata, for example, a namespace-specific address mapping data structure (e.g., a namespace logical to physical (L2P) table) in a memory device. The namespace-specific address mapping data structure can indicate capabilities and settings that are specific to a particular namespace, and can be created, updated, or deleted, e.g., using NameSpace Management and Namespace Attachment commands as defined by the NVM Express™ (NVMe™) Specification.

In certain implementations, the memory (e.g., dynamic random access memory (DRAM)) capacity designated for storing the namespace L2P table is the same for each namespace. An address mapping granularity level refers to a size value representing a smallest unit for which an L2P table entry can be created (i.e., the smallest unit for which its logical address can be translated to a corresponding physical address). In some cases, a first namespace uses an address mapping granularity level exceeding a threshold value and enforces sequential writes, and a second namespace uses an address mapping granularity level below a threshold value and uses random writes. Sequential write means starting writing from the beginning location in a memory device allocated to the namespace. Random write utilizes a write-in-place approach, often creating a scattered data writing pattern with no clear starting point in the memory device allocated to the namespace. The size of the namespace L2P table generated for the first namespace can be less than that of the second namespace. For example, a first namespace using the sequential writes having a capacity of 16 terabytes (TB) might require around 1 gigabyte (GB) for namespace L2P table, while a second namespace using the random writes having the same capacity of 16 TB might require around 16 gigabyte (GB) for namespace L2P table. If the memory designated for storing the namespace L2P table is the same, e.g., 16 GB, for each of the first namespace and the second namespace, the remaining (that is actually not used) capacity of memory designated for storing the namespace L2P table for the first namespace can be 15 GB because only 1 GB is needed, while for the second namespace, the memory designated for storing the namespace L2P table is fully used because 16 GB is needed. The remaining capacity (e.g., 15 GB in the example described above) cannot be used by other namespaces because it is designated for storing the namespace L2P table for the first namespace and kept unchanged for the lifetime of the first namespace.

In addition, as described above, writes can be performed sequentially or randomly in a namespace. A smaller granularity for the namespace L2P table would improve the performance of random writes, but also would drive up the cost because a larger memory (e.g., DRAM) capacity is needed for storing the namespace L2P table for the same namespace. A larger granularity for the namespace L2P table would adversely affect performance of random writes and endurance (e.g., measured by the program erase cycle count), although it would have better cost effectiveness. Conversely, the granularity for the namespace L2P table would not affect much performance of sequential writes. The memory sub-systems do not consider the above situations when allocating memory resources for namespaces and namespace L2P table.

Aspects of the present disclosure address the above and other deficiencies by implementing namespace mapping management in a memory sub-system. The namespace mapping management in a memory sub-system according to the present disclosure means adaptively allocating memory to store namespace L2P table for multiple namespaces instead of using a flat size of memory for storing namespace L2P table of each namespace. The adaptive allocation of memory can be performed by using a set of parameters, including a capacity of namespace, a granularity of namespace L2P table for the namespace, etc. The values for the set of parameters can be determined according to configuration commands.

For example, when the memory sub-system controller receives and processes a request to create, update, or delete one or more namespaces, the memory sub-system controller can determine the target number of namespaces. The memory sub-system controller can determine the available memory size for storing namespace L2P tables of the target-numbered namespaces. The memory sub-system controller can follow a configuration command to set a granularity of namespace L2P table for a namespace and set a capacity of the namespace. For example, the memory sub-system controller can set the granularity of namespace L2P table and the capacity of the namespace by modifying metadata (e.g., granularity, capacity, etc.) used for allocating memory space so that the memory space will be allocated according to the granularity and capacity information included in the metadata. The memory sub-system controller can then calculate the remaining available memory space for storing namespace L2P tables based on the granularity of namespace L2P table and the capacity of the namespace. For example, the size of the namespace L2P table can be calculated, according to a predefined formula, using the granularity of namespace L2P table and the capacity of the namespace, and the memory sub-system controller can then subtract the size of the namespace L2P table from the total memory space for storing namespace L2P tables to obtain the remaining available memory space for storing namespace L2P tables. The memory sub-system controller can follow another configuration command to set a granularity of namespace L2P table for another namespace and set a capacity of another namespace. The memory sub-system controller can continue the process until the target-numbered namespaces have been set. Once the granularity setting of namespace L2P table and the capacity setting of namespaces are finished, the memory sub-system controller can allocate the memory space according to the settings. As such, the memory space used for storing namespace L2P table can be adaptively allocated to different namespaces. While the namespace's need, for example, based on a manner of sequential or random write, workload, etc. may be changed, the memory space for storing namespace L2P table can be dynamically updated following the namespace's need.

Advantages of the present disclosure include improved cost efficiency and enhanced flexibility of managing the metadata. The system according to the present disclosure is compatible with existing namespace management commands, has no impact on sequential write performance and improves the random write performance. The system also enhances endurance of the memory device by adaptively allocating memory resources to store namespace metadata for multiple namespaces.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110. The host system 120 can include one or more mapping structures. Each mapping structure can be a data structure (e.g., a table) with one or more entries. The one or more mapping structures can be coupled to and/or otherwise accessible to the host system 120. Further details with regard to the mapping structures are described with reference to FIG. 2 herein.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Pillar, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level memory cells (SLC) can store one bit per memory cell. Other types of memory cells, such as multi-level memory cells (MLCs), triple level memory cells (TLCs), quad-level memory cells (QLCs), and penta-level memory cells (PLCs) can store multiple bits per memory cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or another suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a namespace data structure (NSDS) management component 113 that can be used to implement the adaptive memory allocation for storing the L2P tables for a set of namespaces in accordance with embodiments of the present disclosure. In some embodiments, the memory sub-system controller 115 includes at least a portion of the NSDS management component 113. In some embodiments, the NSDS management component 113 is part of the host system 110, an application, or an operating system. In other embodiments, local media controller 135 includes at least a portion of NSDS management component 113 and is configured to perform the functionality described herein. Further details regarding implementing managing namespace mapping in a memory sub-system are described herein below with reference to FIGS. 2-5.

It will be appreciated by those skilled in the art that additional circuitry and signals can be provided, and that the components of FIG. 1 have been simplified. It should be recognized that the functionality of the various block components described with reference to FIG. 1 may not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Figure 2:
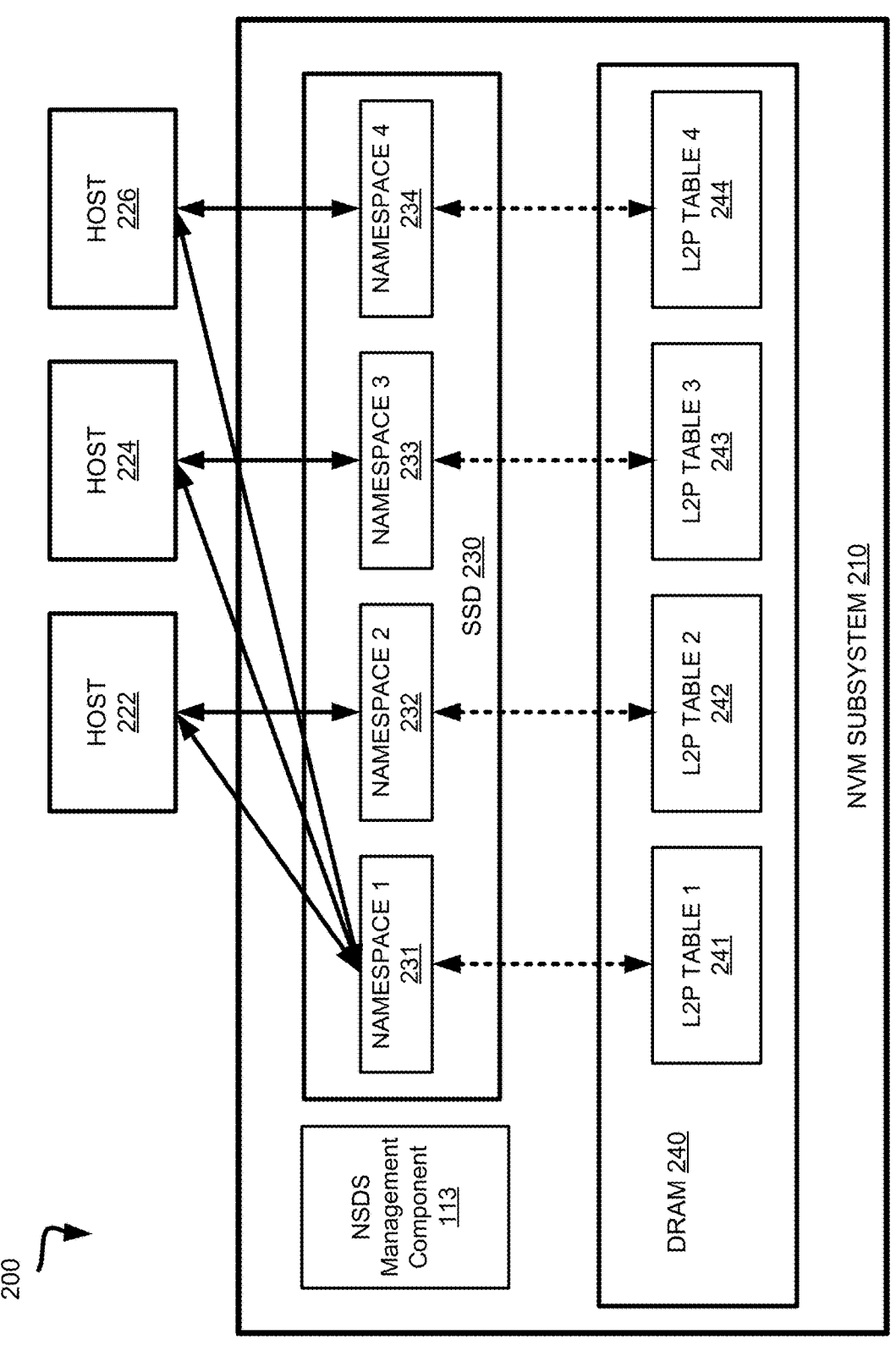
FIG. 2 illustrates an example system including multiple host computing devices enabled with mapping management of namespaces in a memory sub-system, in accordance with some embodiments of the present disclosure.

FIG. 2 illustrates a block diagram of an example system 200 including multiple host computing devices enabled with mapping management of namespaces in accordance with some embodiments of the present disclosure. More specifically, in this illustrative example, the system 200 includes multiple host computing devices 222, 224, 226 sharing an NVM subsystem 210. The hosts 222, 224, 226 can communicate with one or more controllers in the NVM subsystem 210. The controller executes commands submitted by a host on a submission queue and posts a completion on a completion queue. The submission queue and corresponding completion queue are used to submit commands and receive completions for those commands, respectively.

The NVM subsystem 210 may include a non-volatile memory device (e.g., SSD 230) and a volatile memory device (e.g., DRAM 240). The SSD 230 is used to store host data and may include one or more namespaces. The DRAM 240 is used to store metadata. In some implementations, the SSD 230 includes one or more namespaces 231, 232, 233, 234. A namespace is a formatted quantity of non-volatile memory device that can be directly accessed by a host. A namespace may be attached to two or more controllers in an NVM subsystem concurrently as a shared namespace among two or more hosts. As shown in FIG. 2, the namespace 231 may be shared among host 222, host 224, and host 226, while host 222 has a separate namespace 232, host 224 has a separate namespace 233, and host 226 has a separate namespace 234.

Each namespace 231, 232, 233, 234 is associated with a namespace-specific address mapping data structure (referred to as "L2P table") 241, 242, 243, 244, respectively. Each L2P table 241, 242, 243, 244 is stored in the DRAM 240.

Each L2P table 241, 242, 243, 244 can be associated with a NSID, which is an identifier used by a controller to provide access to a namespace.

The NVM subsystem 210 can include a NSDS management component 113. The NSDS management component 113 provides an environment to dynamically adjust the size of the DRAM 240 assigned to L2P tables 241, 242, 243, 244 according to memory access commands. In one example, namespace 1, namespace 2, namespace 3, and namespace 4 each has a capacity of 512 GB, and the SSD 230 has a capacity of 2 TB. The size of DRAM 240 required for a 2 TB SSD 230 is 2 GB at 4 KB granularity, and L2P table 1, L2P table 2, L2P table 3, and L2P table 4 each has a size of 512 MB. Alternatively, the size of DRAM 240 required for a 2 TB SSD 230 is 1 GB at 8 KB granularity, L2P table 1, L2P table 2, L2P table 3, and L2P table 4 each has a size of 256 MB. For the case of 512 MB L2P table each with 4 KB granularity, if namespace 1 and namespace 2 have a random write and namespace 3 and namespace 4 have a sequential write, the cost of the memory device would be high (i.e., cost corresponding to 2 GB) because of the use of the smaller granularity of L2P table; however the granularity of L2P table for namespace 3 and namespace 4 can be larger to save the cost because the sequential write would not be affected by the size of the granularity of L2P table. For the case of 256 MB L2P table each with 8 KB granularity, if namespace 1 and namespace 2 have a random write and namespace 3 and namespace 4 have a sequential write, the cost of the memory device would be low (e.g., cost corresponding to 1 GB) because of the use of the larger granularity of L2P table; however the granularity of L2P table for namespace 3 and namespace 4 can be smaller to have a better performance because the random write would have a better performance with a smaller granularity of L2P table.

To implement the namespace mapping management in the above examples, the NSDS management component 113 can adjust, based on each namespace's need (e.g., according to whether the namespace is associated with sequential write or random write), the size of L2P table assigned to each namespace by defining the address mapping granularity level. For example, the NSDS management component 113 can assign L2P table 1 a size of 512 MB with a 4 KB granularity, L2P table 2 a size of 256 MB with an 8 KB granularity, L2P table 3 a size of 128 MB with a 16 KB granularity, and L2P table 4 a size of 128 MB with a 16 KB granularity. Specifically, the NSDS management component 113 may determine the number of the namespaces and determine the total size of DRAM 240 available to the namespaces. For example, the NSDS management component 113 may determine four namespaces, i.e., namespace 1, namespace 2, namespace 3, and namespace 4 aiming to use a total size of 1 GB DRAM 240.

In some implementations, the NSDS management component 113 may determine the priority for assigning a namespace, for example, a namespace with random write having a higher priority than a namespace with sequential write, and a namespace with heavier workload having a higher priority than lighter workload. For example, the NSDS management component 113 may determine that namespace 1 and namespace 2 have a random write and namespace 3 and namespace 4 have a sequential write, determine that namespace 1 has a heavier workload than namespace 2, and determine that the workloads of namespace 3 and namespace 4 are in a same range, the NSDS management component 113 may determine the priority for assigning to be namespace 1 over namespace 2 over namespace 3 over namespace 4. Thus, the NSDS management component 113 may use a granularity of L2P table indicated in a memory access command for the namespace 1, for example, 4 KB granularity for L2P table 1, and allocate the memory device according to the namespace capacity of namespace 1, for example, 512 GB. The size of L2P table 1 can be calculated based on the determined granularity of L2P table 1, and in most cases, the size of the L2P table is inversely proportional to the granularity of L2P table 1. For example, the size of L2P table in 512 MB can correspond to a granularity in 4 KB, the size of L2P table in 256 MB can correspond to a granularity in 8 KB, and the size of L2P table in 128 MB can correspond to a granularity in 16 KB.

The NSDS management component 113 may then calculate the remaining capacity of SSD 230 after allocating for namespace 1 and the remaining capacity of DRAM 240 after assigning for L2P table 1, and continue to allocate for namespace 2 and assign for L2P table 2. Specifically, the NSDS management component 113 may determine whether the remining capacity of SSD 230 is larger than the capacity requested in the command for namespace capacity of namespace 2, for example, 512 GB, and determine whether the remining capacity of DRAM 240 is larger than the size of L2P table 2 requested following the command. Responsive that the remining capacity of SSD 230 is larger than the capacity requested in the command for namespace capacity of namespace 2 and the remining capacity of DRAM 240 is larger than the size of L2P table 2, the NSDS management component 113 may use a granularity of L2P table indicated in a memory access command for the namespace 2, for example, 8 KB granularity for L2P table 2, and allocate the memory device according to the namespace capacity of namespace 2, for example, 512 GB. The NSDS management component 113 may continue the process until all four namespaces are allocated and all four corresponding L2P tables are assigned.

Figures 3A, 3B:
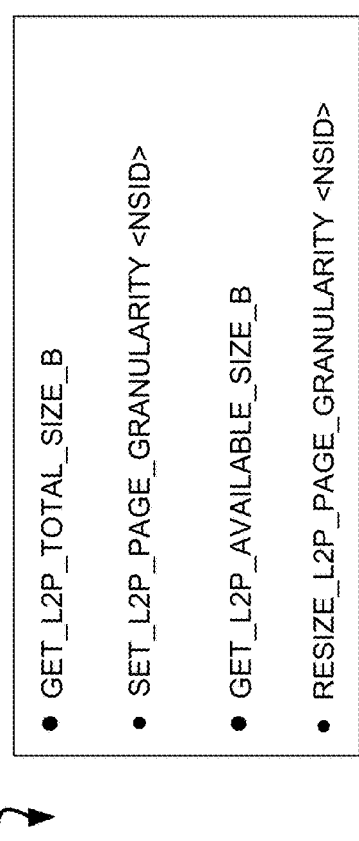
FIG. 3A illustrates an example set of parameters associated with namespace mapping management in a memory sub-system, in accordance with some embodiments of the present disclosure.
FIG. 3B illustrates examples of commands associated with namespace mapping management in a memory sub-system, in accordance with some embodiments of the present disclosure.

FIG. 3A illustrates an example set of parameters 300A associated with namespaces in a memory sub-system, in accordance with some embodiments of the present disclosure. As illustrated in FIG. 3A, the example set of parameters associated with namespaces include an internal namespace identifier (NSID), an LBA range, a namespace capacity, a L2P table granularity, and a L2P table size. The NSID can identify a namespace to which a specific range of LBAs is mapped. Each entry represents SSD allocation of each namespace and DRAM allocation of corresponding L2P table with the specific granularity. For example, NSID 1 can include an LBA range from xxx to xxx', NSID 2 can include an LBA range from yyy to yyy', NSID 3 can include an LBA range from zzz to zzz', and NSID 4 can include an LBA range from aaa to aaa'. Each consecutive NSID can have a sequential range of LBAs. In some embodiments, there can be 512 namespaces (e.g., 512 NSIDs). In some embodiments, the number of namespaces can be preconfigured at manufacturing based on offline testing and media characterization of the memory device. In some embodiments, the namespaces can be mapped to up to 2048 LBA ranges. In some embodiments, the number of LBA ranges that can be mapped to namespaces can be preconfigured at manufacturing based on offline testing and media characterization of the memory device. In some embodiments, the size of each LBA range can be predetermined. For example, NSID 1 has an LBA range with a size of 512 GB; NSID 2 has an LBA range with a size of 512 GB; NSID 3 has an LBA range with a size of 512 GB; and NSID 4 has an LBA range with a size of 512 GB. In some embodiments, each NSID can have an LBA range with a differing size than another NSID. In some embodiments, each NSID can have an LBA range with the same size as another NSID or each NSID. In some embodiments, the size of each LBA range can be up to the drive capacity of the memory device. In some embodiments, the size of each LBA range is defined by a host system of the memory sub-system. In some embodiments, the size of each LBA range is preconfigured at manufacturing based on offline testing and media characterization of the memory device.

As shown in FIG. 3A, NSID 1 has a namespace capacity of 512 GB, NSID 2 has a namespace capacity of 512 GB, NSID 3 has a namespace capacity of 512 GB, and NSID 4 has a namespace capacity of 512 GB. NSID 1 has a L2P table granularity of 4 KB, NSID 2 has a L2P table granularity of 8 KB, NSID 3 has a L2P table granularity of 16 KB, and NSID 4 has a L2P table granularity of 16 KB. NSID 1 has a L2P table size of 512 MB, NSID 2 has a L2P table size of 256 MB, NSID 3 has a L2P table size of 128 MB, and NSID 4 has a L2P table size of 128 MB.

FIG. 3B illustrates an example of the configuration commands that can be utilized for determining the memory allocation for storing L2P tables for a set of namespaces. GET_L2P_TOTAL_SIZE_B represents exposing the total size of DRAM "B" available for allocation. SET_L2P_PAGE_GRANNULARITY<NSID> represents setting the L2P table granularity of the namespace <NSID>. GET_L2P_AVAILABLE_SIZE_B represents exposing the remaining size of DRAM "B" available for allocation. RESIZE_L2P_PAGE_GRANULARITY <NSID> represents changing the L2P table granularity of the namespace <NSID> during the lifetime of DRAM.

Figure 3C:
FIG. 3C illustrates an example a namespace logical to physical (L2P) table associated with the namespace in a memory sub-system, in accordance with some embodiments of the present disclosure.

FIG. 3C illustrates an example L2P table 300C associated with a namespace in a memory sub-system, in accordance with some embodiments of the present disclosure. L2P table 300C can include one or more entries 310C. Each entry 310C can include a logical block address (LBA) field that is configured to store an address (or an identifier) associated with an LBA. Each entry 410 can also include a physical block address (PBA) field that is configured to store an address (or an identifier) associated with a PBA (e.g., residing at a memory device 310). In some embodiments, the memory sub-system controller 115 can generate, for each namespace, a mapping between an address or identifier associated with a particular LBA and an address or identifier associated with a particular PBA, for example, during an initialization of the memory sub-system 110. The memory sub-system controller 115 can store the generated mapping at DRAM 240.

FIG. 4 is a flow diagram of an example method to implement managing namespace metadata with commands in a memory sub-system, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the NSDS management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The processing logic can receive a request (e.g., from a host system) to modify one or more regions of a memory device. Each region can be a portion of the memory device and represent a namespace of the memory device. The request can include an instruction to create a new region, update a region, or remove a region. In some embodiments, the processing logic can identify one or more mapping structures that are associated with each region (e.g., each namespace). For example, the one or more mapping structures can include the namespace L2P table that includes a mapping of each LBA or a range of LBAs to a particular namespace ID. For example, the request can include an instruction to create a new region. In response, the processing logic can add or update an entry of each mapping structure to reference the new region. In another example, the request can include an instruction to update a region. In response, the processing logic can update an entry of each mapping structure to reference the update to the region. In another example, the request can include an instruction to remove (e.g., delete) a region. In response, the processing logic can remove an entry referring the removed region in each mapping structure.

In some embodiments, the processing logic can receive the request at a memory sub-system controller (e.g., the memory sub-system controller 115 of FIG. 1) from a host device (e.g., the host system 120 of FIG. 1). In some embodiments, processing logic can receive the request via an interface port coupled to the memory sub-system controller and the host device. Examples of interface ports include a serial advanced technology attachment (SATA) interface, a peripheral component interconnect express (PCIe) interface, universal serial bus (USB) interface, Fibre Channel, Serial Attached SCSI (SAS), etc. The host device can further utilize an NVM Express (NVMe) interface to access the memory sub-system controller when the memory sub-system is coupled to the host device by the PCIe interface. The interface port can provide an interface for passing control, address, data, and other signals between the memory sub-system and the host device. The memory sub-system can include multiple interface ports. In some embodiments, the processing logic can receive the request by accessing one or more registers associated with the host device, wherein the one or more registers stores the request sent by the host device.

At operation 410, the processing logic obtains a total size of a first memory device (e.g., DRAM 240) designated for storing a plurality of address mapping data structures (e.g., L2P tables 241, 242, 243, 244), where each address mapping data structure is associated with a corresponding namespace of a plurality of namespaces, where each of the plurality of namespaces (e.g., namespaces 231, 232, 233, 234) corresponds to a corresponding region of a second memory device (e.g., SSD 230), and the second memory device is divided into the plurality of namespaces. In some implementations, the first memory device comprises a volatile memory device (e.g., DRAM) and the second memory device comprise a non-volatile memory device (e.g., SSD). In some implementations, the processing logic obtains the total size of a first memory device by executing a command GET_L2P_TOTAL_SIZE_B as shown in FIG. 3B.

In some implementations, the processing logic may determine the number of the plurality of namespaces of a second memory device, and determine a size of a first memory device designated for storing a plurality of address mapping data structures for the plurality of namespaces of the second memory device.

In some implementations, the processing logic may receive a request to create, update, or delete one or more namespaces, and the request may include the target total number of namespaces after processing the request. In response, processing logic may obtain a total size of a first memory device designated for storing the address mapping data structures of the namespaces in the target total number. In some implementations, the processing logic may receive a request to create, update, or delete one or more namespaces, and the request may include the target additional number of namespaces after processing the request, which means that existing namespace would not be affected. In response, the processing logic may obtain a total size of a first memory device designated for storing the address mapping data structures of the namespaces in the target additional number.

At operation 420, the processing logic sets a first granularity, by associating a first address mapping granularity level with the first memory device for storing a first address mapping data structure of the plurality of address mapping data structures, and sets a first capacity by associating the first capacity with the second memory device used as a first namespace of the plurality of namespaces, the first address mapping data structure corresponding to the first namespace. In some implementations, the processing logic may output the total size of the first memory device obtained at operation 410 to a user and the user can use the information to determine a first granularity (e.g., 4 KB) in the first memory device (e.g., DRAM) for storing the first address mapping data structure. In some implementations, the processing logic may set the first granularity of the first address mapping data structure by executing a command SET_L2P_PAGE_GRANULARITY <NSID> as shown in FIG. 3B. In some implementations, the processing logic may set the first capacity of the second memory device used as a first namespace by executing a standard command.

At operation 430, the processing logic calculates a remaining size of the first memory device by excluding a first size of the first address mapping data structure from the total size of the first memory device, and calculates a remaining capacity of the second memory device by excluding the first capacity of the second memory device from a total capacity of the second memory device. The first size of the first metadata is calculated based on the first granularity of the first metadata. In some implementations, the processing logic obtains the remaining size of a first memory device by executing a command GET_L2P_AVAILABLE_SIZE_B as shown in FIG. 3B.

At operation 440, in view of the remaining size of the first memory device and the remaining capacity of the second memory device, the processing logic sets a second granularity in the first memory device for storing a second metadata of the plurality of metadata, and sets a second capacity of the second memory device used as a second namespace of the plurality of namespaces, the second metadata corresponding to the second namespace. For example, the processing logic can determine whether the remaining capacity of the second memory device is larger than the second capacity of the second memory device used as a second namespace of the plurality of namespaces, and whether the remaining capacity of the first memory device is larger than a second size of the second address mapping data structure, where the second size of the second address mapping data structure can be calculated, according to a predefined formula, using the granularity of the second address mapping data structure and the second capacity of the second namespace. For example, the predefined formula may be that the size of the address mapping data structure (e.g., in bytes) equals the entry size in the address mapping data structure (e.g., in bytes) multiplied by the capacity of the namespace (e.g., in KB) and divided by the granularity of the address mapping data structure (e.g., in KB), e.g., $$L2P \text{ table size} = L2P \text{ table entry size} \times \frac{\text{namepsace capacity}}{L2P \text{ table granularity}}.$$

Responsive to determining that the remaining capacity of the second memory device is larger than the second capacity of the second memory device used as a second namespace of the plurality of namespaces and that the remaining capacity of the first memory device is larger than a second size of the second address mapping data structure, the processing logic sets the second granularity in the first memory device for storing a second metadata of the plurality of metadata, and sets the second capacity of the second memory device used as a second namespace of the plurality of namespaces. Setting the second granularity of a second metadata and setting the second capacity of a second namespace can be similar to the operation 420.

Responsive to determining that the remaining capacity of the second memory device is not larger than the second capacity of the second memory device used as a second namespace of the plurality of namespaces or that the remaining capacity of the first memory device is not larger than a second size of the second address mapping data structure, the processing logic generates a notification of error.

In some implementation, the processing logic may set a plurality of granularity in the first memory device each for storing a respective metadata of the plurality of metadata, and set a plurality of capacity in the second memory device each used as a respective namespace of the plurality of namespaces, the respective metadata corresponding to the respective namespace.

Identifying the instruction specified by the request can include reading the request (e.g., reading the data of the request) to identify the one or more instructions. In some embodiments, the one or more instructions can be to add (e.g., create) a new region and add the new region to the one or more regions. In some embodiments, the one or more instructions can be to update an existing region of the one or more regions. In some embodiments, the one or more instructions can be to remove (e.g., delete) an existing region of the one or more regions. In some embodiments, in response to identifying the instruction specified by the request, the processing logic can update one or more entries of parameters of the namespace mapping management table in accordance with the one or more instructions. For example, the one or more instructions can be to create a new region. In response, the processing logic can add or update one or more entries of namespace mapping management table to include data that references the new region. For example, using FIG. 3A as an example, the processing logic can add one or more entries to the namespace mapping management table 300A. An entry can be added with a new NSID (e.g., NSID 5), an entry can be added with a new LBA range (e.g., LBA 41-50), and a size of the LBA range (e.g., 256 GB) can be added to another entry.

In some embodiments, the one or more instructions can include data specifying the new LBA range and/or the size of the LBA range. In some embodiments, the new LBA range is a sequential range of LBAs of the size specified by the one or more instructions. The processing logic can also update, e.g., one or more entries of the namespace mapping management table 300A. In some embodiments, an entry can be added with a set of permissions for the new LBA range. In some embodiments, the one or more instructions can include data specifying the set of permissions for the new LBA range. In another example, the request can include an instruction to update a region. In response, the processing logic can update one or more entries of namespace mapping management table 300A to include data referencing the update to the region. For example, using FIG. 3A as an example, the processing logic can update one or more entries to the namespace mapping management table 300A. For example, the size entry for NSID 4 can be updated with a new size.

In some embodiments, the one or more instructions can include data specifying which entries to update and the updates (e.g., the data to update the entries with). In another example, the request can include an instruction to remove (e.g., delete) a region. In response, the processing logic can remove one or more entries of each mapping structure that reference a particular region. For example, using FIG. 3A as an example, the processing logic can remove one or more entries of the namespace mapping management table 300A. For example, the entries for NSID 3 can be removed (e.g., the NSID 3 entry, the LBA range entry referencing LBA 21 to LBA 30, the namespace capacity entry of 512 GB, the L2P table granularity entry of 16 KB, and the L2P table size entry of 128 MB). In some embodiments, removing an entry can include removing and/or updating one or more pointers to the entry.

In some implementations, the processing device may determine whether the first memory device has been fully assigned to the plurality of metadata and the second memory device has been fully assigned to the plurality of namespaces. In some implementations, responsive to determining that the first memory device has not been fully assigned to the plurality of metadata or the second memory device has not been fully assigned to the plurality of namespaces, the processing device may generate a notification of error or warning.

Figure 5:
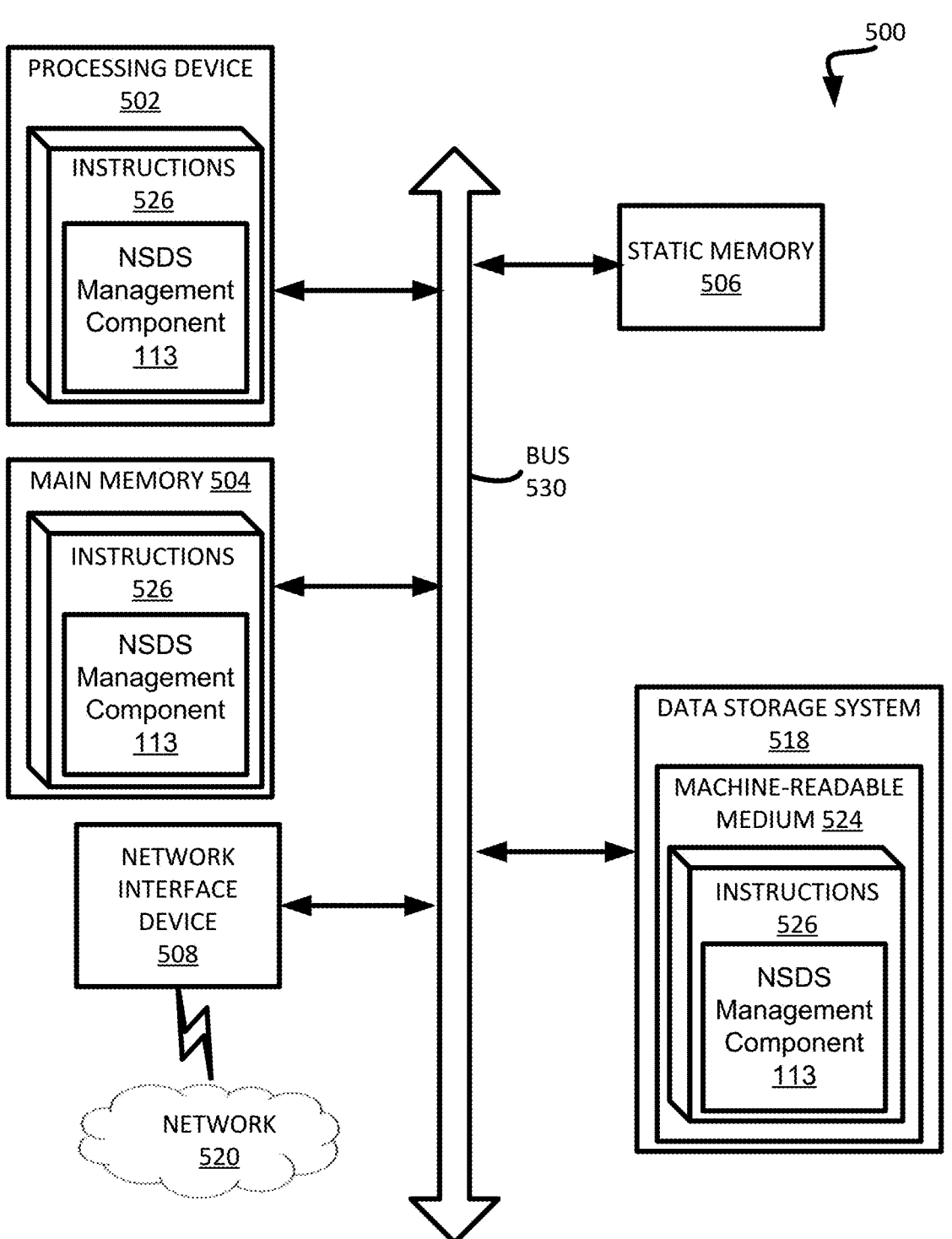
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the NSDS management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a memory cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a component (e.g., NSDS management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a first memory device;
a second memory device; and
a processing device, operatively coupled with the first memory device and the second memory device, to perform operations comprising:
    determining a size of the first memory device designated for storing a plurality of address mapping data structures, wherein each address mapping data structure of the plurality of address mapping data structures is associated with a corresponding namespace of a plurality of namespaces, wherein each namespace of the plurality of namespaces is associated with a corresponding region of a second memory device;
    associating a first address mapping granularity level with the first memory device for storing a first address mapping data structure of the plurality of address mapping data structures;
    determining a remaining available space of the first memory device by excluding a first size of the first address mapping data structure from the size of the first memory device, wherein the first size is calculated based on the first address mapping granularity level; and
    associating, in view of the remaining available space of the first memory device and a remaining available space of the second memory device, a second address mapping granularity level with the first memory device for storing a second address mapping data structure of the plurality of address mapping data structures.

2. The system of claim 1, wherein the operations further comprise: receiving a request to modify one or more regions of the second memory device.

3. The system of claim 2, wherein the request to modify the one or more regions of the memory device comprises an instruction to add a region to the one or more regions.

4. The system of claim 2, wherein the request to modify the one or more regions of the memory device comprises an instruction to at least one of update or remove a region of the one or more regions.

5. The system of claim 1, wherein the operations further comprise:
associating a first capacity with the second memory device, the first capacity being used as a first namespace of the plurality of namespaces, the first address mapping data structure being associated with the first namespace.

6. The system of claim 5, wherein the operations further comprise:
determining the remaining available space of the second memory device by excluding the first capacity from a total capacity of the second memory device.

7. The system of claim 6, wherein the operations further comprise:
associating, in view of the remaining available space of the second memory device, a second capacity with the second memory device, the second capacity being used as a second namespace of the plurality of namespaces, the second address mapping data structure being associated with the second namespace.

8. The system of claim 1, wherein determining the size of the first memory device associating the first address mapping granularity level determining the remaining available space of the first memory device, and associating the second address mapping granularity level are performed following at least one command.

9. The system of claim 1, wherein the operations further comprise:

determining a target number of the plurality of namespaces; and associating each of a plurality of address mapping granularity levels in the target number with the first memory device for storing a corresponding address mapping data structure of the plurality of address mapping data structures.

10. The system of claim 1, wherein the operations further comprise: adjusting the first address mapping granularity level.

11. The system of claim 1, wherein the operations further comprise: responsive to determining that the remaining available space of the first memory device satisfies a threshold creation, notifying a user of an error.

12. The system of claim 1, wherein the first memory device comprises a volatile memory device, and wherein the second memory device comprise a non-volatile memory device.

13. A method comprising:

determining, by a processing device, a size of a first memory device designated for storing a plurality of address mapping data structures, wherein each address mapping data structure of the plurality of address mapping data structures is associated with a corresponding namespace of a plurality of namespaces, wherein each namespace of the plurality of namespaces is associated with a corresponding region of a second memory device;

associating a first address mapping granularity level with the first memory device for storing a first address mapping data structure of the plurality of address mapping data structures;

determining a remaining available space of the first memory device by excluding a first size of the first address mapping data structure from the size of the first memory device, wherein the first size is calculated based on the first address mapping granularity level; and associating, in view of the remaining available space of the first memory device and a remaining available space of the second memory device, a second address mapping granularity level with the first memory device for storing a second address mapping data structure of the plurality of address mapping data structures.

14. A non-transitory computer-readable storage medium comprising instructions that, when executed by a processing device, cause the processing device to perform operations comprising:

determining a size of a first memory device designated for storing a plurality of address mapping data structures, wherein each address mapping data structure of the plurality of address mapping data structures is associated with a corresponding namespace of a plurality of namespaces, wherein each namespace of the plurality of namespaces is associated with a corresponding region of a second memory device;

associating a first address mapping granularity level with the first memory device for storing a first address mapping data structure of the plurality of address mapping data structures;

determining a remaining available space of the first memory device by excluding a first size of the first address mapping data structure from the size of the first memory device, wherein the first size is calculated based on the first address mapping granularity level; and associating, in view of the remaining available space of the first memory device and a remaining available space of the second memory device, a second address mapping granularity level with the first memory device for storing a second address mapping data structure of the plurality of address mapping data structures.

15. The non-transitory computer-readable storage medium of claim 14, wherein the processing device is to perform operations further comprising:

receiving a request to modify one or more regions of the second memory device.

16. The non-transitory computer-readable storage medium of claim 15, wherein request to modify the one or more regions of the memory device comprises an instruction to add a region to the one or more regions.

17. The non-transitory computer-readable storage medium of claim 15, wherein the request to modify the one or more regions of the memory device comprises an instruction to at least one of update or remove a region of the one or more regions.

18. The non-transitory computer-readable storage medium of claim 14, wherein the processing device is to perform operations further comprising:

associating a first capacity with the second memory device, the first capacity being used as a first namespace of the plurality of namespaces, the first address mapping data structure being associated with the first namespace.

19. The non-transitory computer-readable storage medium of claim 18, wherein the processing device is to perform operations further comprising:

determining the remaining available space of the second memory device by excluding the first capacity from a total capacity of the second memory device.

20. The non-transitory computer-readable storage medium of claim 19, wherein the processing device is to perform operations further comprising:

associating, in view of the remaining available space of the second memory device, a second capacity with the second memory device, the second capacity being used as a second namespace of the plurality of namespaces, the second address mapping data structure being associated with the second namespace.

* * * * *